Figure 1:
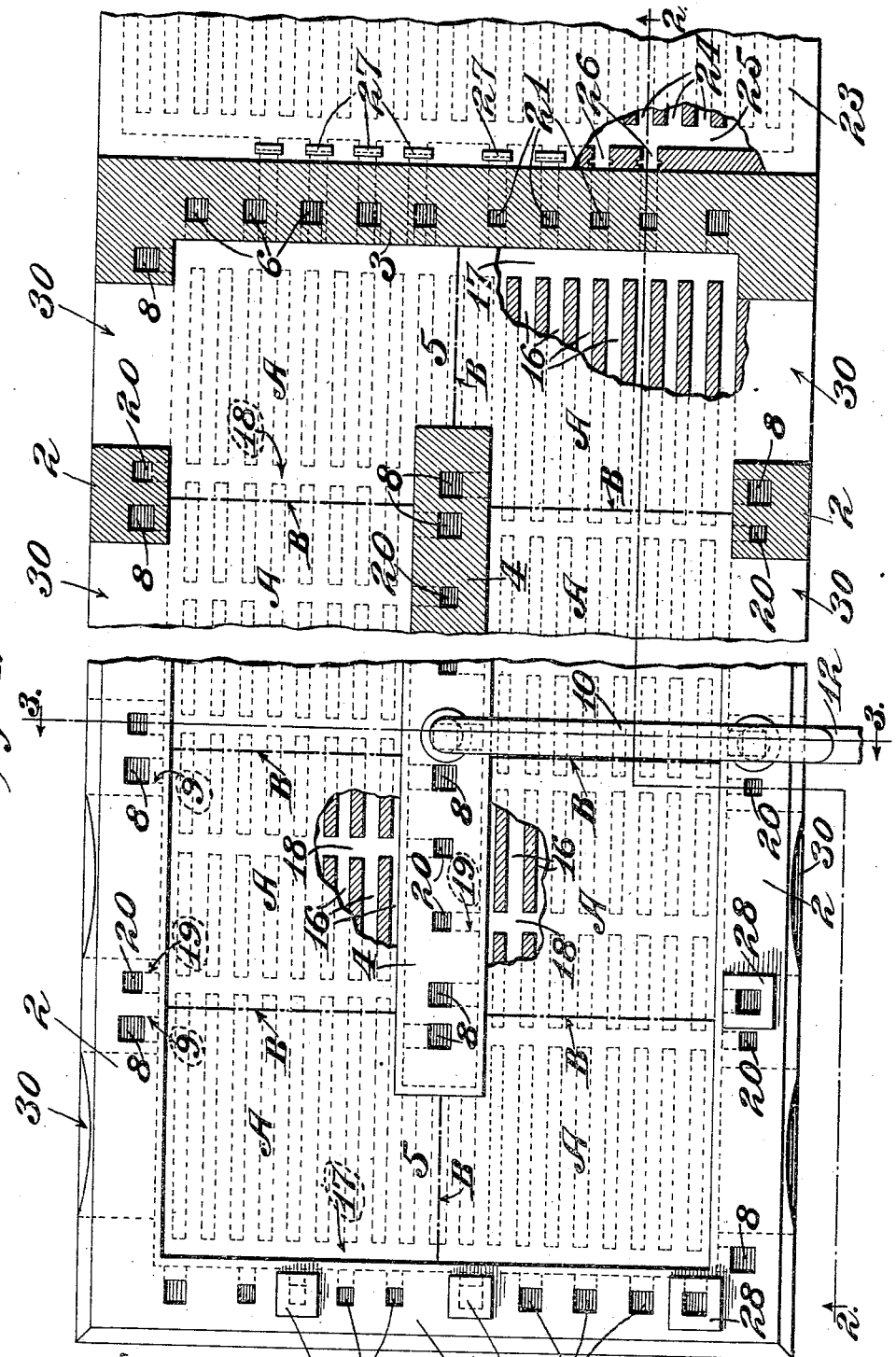

M. ITTNER.
KILN.
APPLICATION FILED MAY 4, 1907.

954,633.

Patented Apr. 12, 1910.
2 SHEETS—SHEET 1.

Witnesses:
G. A. Pennington
J. B. Megown

Inventor:
Martin Ittner,
By Cannet Cann
Attys.

M. ITTNER.
KILN.
APPLICATION FILED MAY 4, 1907.
954,633.
Patented Apr. 12, 1910.
2 SHEETS—SHEET 2.
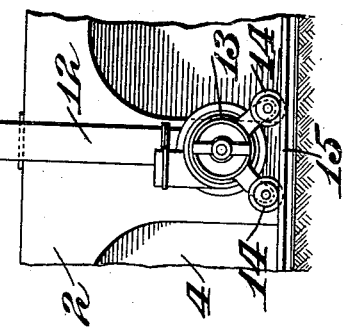
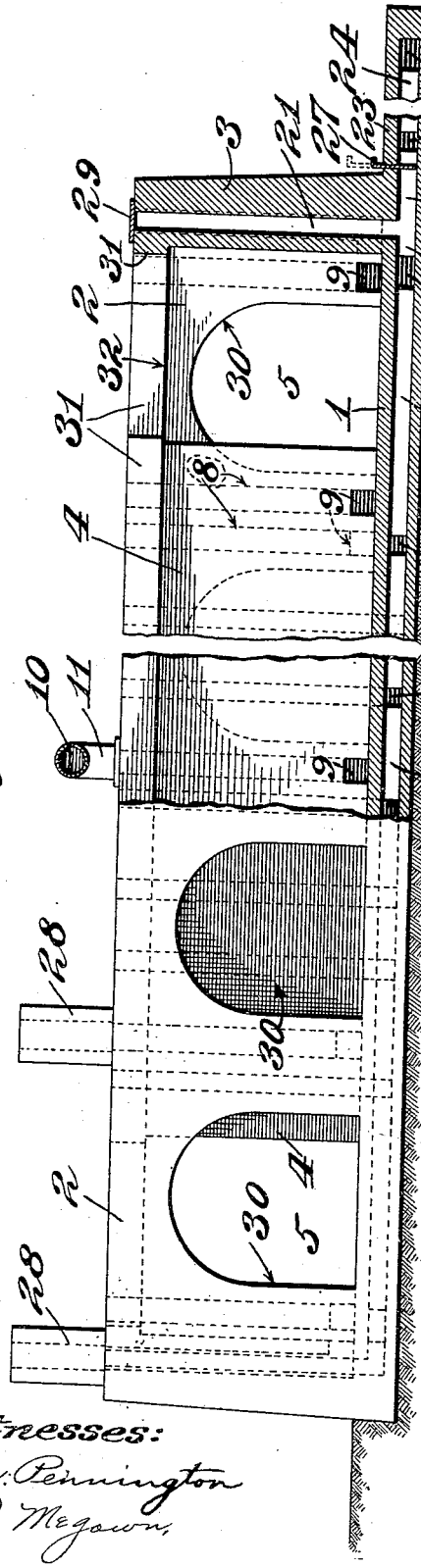
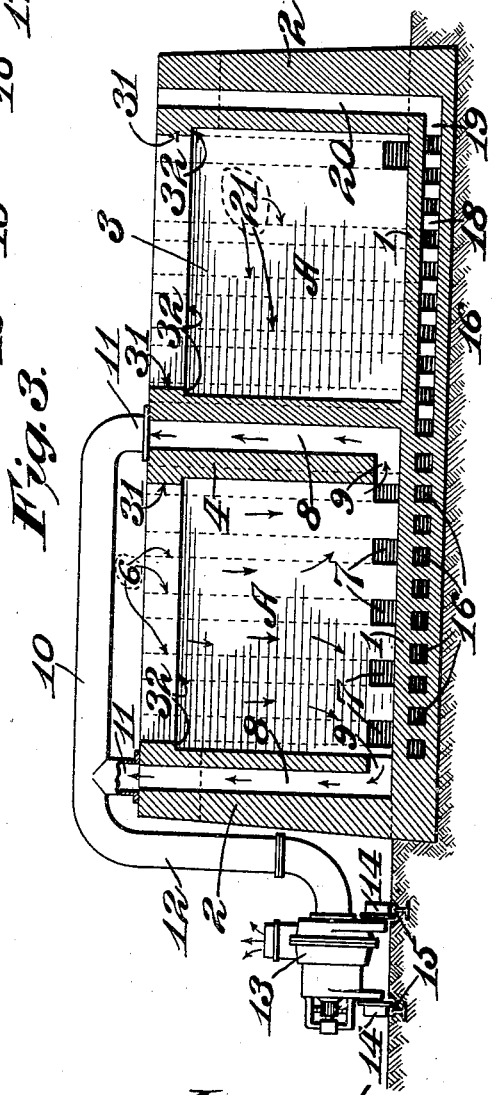
Witnesses:
G. A. Pennington
J. B. McGown
Inventor:
Martin Ittner,
By Cann & Cann,
Attys

UNITED STATES PATENT OFFICE.

MARTIN ITTNER, OF SWANSEA, ILLINOIS.

KILN.

954,633.  Specification of Letters Patent.  Patented Apr. 12, 1910.

Application filed May 4, 1907. Serial No. 371,883.

*To all whom it may concern:*

Be it known that I, MARTIN ITTNER, a citizen of the United States, and a resident of Swansea, county of St. Clair, and State of Illinois, have invented a new and useful Improvement in Kilns, of which the following is a specification.

This invention relates to kilns and especially to continuous kilns for burning brick and the like. It has for its principal object to simplify the construction and to cheapen the cost of kilns; to provide for the simple and easy regulation and control of the drafts; to eliminate dampness; to utilize heat radiated from the kiln to operate a drier; and to attain certain advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a view partly in top plan and partly in horizontal section, with portions of the kiln and drier floor broken away; Fig. 2 is a view partly in side elevation and partly in longitudinal section on the line 2—2 of Fig. 1; Fig. 3 is a transverse section on the line 3—3 of Fig. 1, showing the draft pipe and exhaust fan in operative position; and, Fig. 4 is a side elevation of a portion of the kiln and also showing an end elevation of the draft pipe and exhaust fan.

The kiln is preferably rectangular, of the open top type, and is provided with the usual side openings. It comprises a bottom or floor 1, side and end walls 2 and 3, respectively, and a longitudinal partition or middle wall 4. The middle wall 4 terminates short of the end walls 3 so as to form passageways 5 at each end of the kiln. In operating the kiln it is temporarily divided into a series of compartments or burning chambers A by inflammable or "paper" partitions B, the object being to confine the heat in a chamber until a partition burns out.

In the end walls 3, at diagonally opposite corners of the kiln, are a number of vertical flues 6 which open into the atmosphere at the top of the kiln and have ports 7 opening into the kiln near the floor 1, as best shown in Fig. 3. These flues 6 are draft or combustion flues and are used in the regular course of burning. In the side and middle walls 2 and 4, respectively, are vertical flues 8 which are similar to the before-mentioned flues 6 and have port openings 9 near the floor of the kiln. Preferably, these flues 8 are so arranged that each chamber A is provided with a pair of flues located at diametrically opposite points (see Figs. 1 and 3).

A portable draft apparatus comprising a pipe 10 having downwardly extending portions 11 is arranged to connect a pair of the vertical flues 8. Said pipe 10 has also a downturned extension 12 which is attached to an exhaust fan 13. The draft pipe 10 is adapted to be removed from one burning chamber A to another at will, and, preferably, the exhaust fan is mounted on a truck or flanged wheels 14 which run upon a trackway 15. It is obvious, however, that the exhaust fan may be stationarily mounted and have connected therewith a pipe which extends lengthwise alongside of the kiln and which is provided with suitable branches to which the draft pipe 10 may be attached.

The floor 1 of the kiln is hollow. Preferably, it is provided with a plurality of longitudinal flues or passageways 16. These passageways run substantially the full length of the kiln floor and terminate in transverse passageways 17 near the end walls 3. At intervals the longitudinal passageways 16 are intersected by transverse passageways 18 which are in line with and communicate with the port openings 19 of vertical flues 20 in the side and middle walls 2 and 4 of the kiln, as best shown in Fig. 3. In the end walls 3 are a number of vertical flues 21 which have ports 22 opening into the transverse passageways 17. This same construction of hollow floor may be extended beyond the end wall or walls to constitute a drier floor upon which green bricks may be dried preparatory to placing them in the kiln for burning. As shown in the drawings the drier floor is extended from only one end of the kiln, but it is obvious that a floor could be extended from each end if desired. In the present case the drier floor 23 is provided with longitudinal flues or passageways 24 and transverse passageways 25 which are arranged similarly to those in the floor 1. The hollow floors 1 and 23 are connected by passageways 26, which are provided with suitable gate valves or dampers 27 (see Figs. 1 and 2). Portable flue tops or extensions 28 are provided for use under certain conditions, and cover plates or dampers 29 are employed to close the vertical flues when not in use.

The flues or passageways under the floor have no connection or communication with the fires or products of combustion. All the heat which comes into them is radiated through the floor 1 which is laid tight or imperforate. When the kiln is fired, the heat which radiates through the floor will expel all dampness from beneath the floor, and when the passageways or flues are once thoroughly dried out they will greatly assist in heating the kiln floor under the green bricks ahead of the fires, thus materially shortening the time of burning. Furthermore, by opening the dampers 27 and closing the flues 20 and 21, the heat which would ordinarily be wasted by being allowed to pass off through said flues, may be diverted into the hollow drier floor. If desired, a forced-draft apparatus may be applied to the flues 20 and 21, or to equivalent openings in the drier floor to produce a forced circulation through both the kiln and drier floors.

In the operation of the kiln, green bricks, or bricks which have been somewhat dried on the drier floor, are piled in the several burning chambers A in the usual manner. The dividing partitions B are then placed in position. After a chamber is filled with green bricks the open top is closed by layers of brick laid close together and sealed with mud except at those places where holes are left for the insertion of the fire pots into which coal or other fuel is fed. Preferably the walls of the kiln are provided with inwardly projecting portions 31 at the top which form overhanging shoulders 32. The temporary top or platen is placed between the portions 31 and thus when the stack of brick settles in a chamber, said platen instead of catching at its edges against the walls will settle bodily and evenly below said overhanging shoulders 32 without sagging at its middle or breaking. The openings 30 in the side walls are also tightly closed in the usual manner. The partitions B may be provided with openings near the floor of the kiln or the lower edges thereof may be raised a short distance above the floor so as to form an opening across the entire width of the chamber. In practice, to get the best results and to economically operate the kiln, several chambers are filled ahead of the chamber being fired. The draft pipe 10 is placed in operative position over the flues 8 of a chamber some distance, say four chambers, ahead of said chamber being fired. Thus, the chamber next adjacent to the one being fired will be very hot, the next hot, the next very warm and the last warm, the air being drawn from the chamber being fired successively through said other chambers and exhausted out through the draft pipe 10 and exhaust fan 13. By providing the kiln with a large number of chambers the kiln may be operated continuously. That is, while one chamber is being fired and others ahead thereof are being heated up, those next adjacent to the rear of said chamber being fired are cooling down, while others are empty, being emptied or being filled.

By the use of the draft pipe and exhaust fan, the drafts may be easily regulated and controlled, and the expense and disadvantages of providing a stack and extensive system of smoke and draft flues are overcome. So, too, by providing the vertical smoke and draft flues in the walls of the kiln and having the port openings near the floor of the respective chambers, the heat is drawn to the bottom from the top through the piles of bricks, and thereby the lowermost bricks will be as thoroughly and uniformly burned as the uppermost ones.

Obviously, the kiln admits of considerable modification within the scope of my invention, and, therefore, I do not wish to be limited to the exact construction and arrangements herein shown.

What I claim as my invention and desire to secure by Letters Patent is:

1. A kiln provided with burning chambers, the walls of each of said chambers being provided with vertical flues which open to the outside of said kiln and have port openings into said chambers, and a portable draft apparatus arranged to coöperate with said flues the floors of said chambers having flues therein which communicate with the atmosphere and are entirely independent of said first mentioned flues.

2. A kiln provided with burning chambers, the walls of each of said chambers being provided with vertical flues which open to the outside of said kiln at the top and have port openings into said chambers near the floor thereof, and a portable draft apparatus arranged to coöperate with said flues, said floor having flues therein which communicate with the atmosphere and are entirely independent of said first mentioned flues.

3. A burning kiln comprising a floor and inclosing walls, said kiln having flues extending from the atmosphere under said floor and thence upwardly through said walls said flues having no communication with the combustion chamber of said kiln.

4. A burning kiln comprising inclosing walls having vertical flues therein and an imperforate floor having a plurality of flues communicating both with said vertical flues and with the air but having no communication with the combustion chamber of said kiln.

5. A kiln comprising a burning chamber having inclosing walls and an imperforate hollow floor, and a drier comprising a hollow floor outside of said chamber, the spaces in the floor of said drier communicating with the spaces in said first mentioned floor, and also being open to the atmosphere but having no communication with the combustion chamber of said kiln.

6. A kiln comprising a burning chamber having inclosing walls having vertical flues therein and means for opening and closing said flues, an imperforate hollow floor for said chamber having communication with said flues and with the atmosphere but having no communication with the combustion chamber of said kiln, and an imperforate hollow floor outside of said chamber but in communication with said first mentioned floor.

Signed at St. Louis, Missouri, this 1st day of May, 1907.

MARTIN ITTNER.

Witnesses:
G. A. PENNINGTON,
ANTHONY F. ITTNER.